United States Patent [19]

Strandjord et al.

[11] Patent Number: 5,016,240
[45] Date of Patent: * May 14, 1991

[54] OPTICAL RECORDING MEDIUM

[75] Inventors: Andrew J. Strandjord; Donald J. Perettie; Ronald L. Yates, all of Midland, Mich.

[73] Assignee: The Dow Chemical Company, Midland, Mich.

[*] Notice: The portion of the term of this patent subsequent to Mar. 5, 2008 has been disclaimed.

[21] Appl. No.: 501,058

[22] Filed: Mar. 29, 1990

Related U.S. Application Data

[60] Division of Ser. No. 140,172, Dec. 31, 1987, Pat. No. 4,998,239, which is a continuation-in-part of Ser. No. 14,882, Feb. 2, 1987, abandoned, which is a continuation-in-part of Ser. No. 105,426, Oct. 7, 1987, abandoned.

[51] Int. Cl.$^5$ .............................................. G11B 7/24
[52] U.S. Cl. .................... 369/288; 430/945; 369/275.4; 369/275.2; 346/135.1
[58] Field of Search ............ 369/288, 284, 286; 430/945, 495; 428/64, 172; 346/135.1, 762

[56] References Cited

U.S. PATENT DOCUMENTS

| 4,238,803 | 12/1980 | Terao et al. | 369/275.1 |
| 4,726,858 | 2/1988 | Minemura et al. | 430/945 X |
| 4,773,059 | 9/1988 | Minemura et al. | 369/100 |
| 4,904,577 | 2/1990 | Tyran et al. | 430/945 |

Primary Examiner—Stuart S. Levy
Assistant Examiner—Hoa Nguyen
Attorney, Agent, or Firm—Bruce M. Kanuch

[57] ABSTRACT

An optical memory storage media is described, e.g. a compact disc. A method of preparing the media (e.g. discs) is also taught. The storage media is formed from a substrate material having tightly bonded to the surface a highly reflective soft metal alloy formed of, for example, an alloy including at least five percent by weight of each of at least two metals selected from the group consisting of cadmium, indium, tin, antimony, lead, bismuth, magnesium, copper, aluminum, zinc and silver.

7 Claims, 5 Drawing Sheets

OPTICAL RECORDING MEDIUM

CROSS REFERENCE TO RELATED APPLICATIONS

This is a divisional of application Ser. No. 140,172, filed Dec. 31, 1987, now U.S. Pat. No. 4,998,239, which was a continuation in part of application Ser. No. 014,822, filed Feb. 2, 1987 now abandoned, which was a continuation in part of application Ser. No. 105,426, filed Oct. 7, 1987, now abandoned.

FIELD OF THE INVENTION

The present invention relates generally to materials for storage of coded information and methods of fabricating such materials and more particularly to such materials which are designed specifically for optical information storage.

BACKGROUND OF THE INVENTION

Optically retrievable information storage systems have been commercially available for some time in the form of video discs and audio discs (more commonly referred to as compact discs, i.e. CD's.) More recently, systems in other forms such as optical tape (Gelbart U.S. Pat. No. 4,567,585), and data information cards, like that developed by Drexler Technology Corporation, Mountain View, Calif. (Drexler U.S. Pat. No. 4,544,835) are beginning to attract commercial attention. Information carriers or storage media such as video discs and audio discs are often referred to as Read-Only Memories (ROM). The information is typically stored as extremely small structural relief features which are permanently molded into the substrate during the manufacturing process. Optical retrieval of such data is typically accomplished through differential reflection techniques using a frequency modulated laser light source.

Information can be placed on these optical memories in extremely high densities, the theoretical limit being determined by the absolute resolving power of a laser beam focused down to its diffraction limited size ($\lambda/2NA$, wherein $\lambda$ is the wavelength of the laser and NA is the numerical aperture of the focused beam). The information stored on these ROM media is, in principle, capable of being optically accessed an infinite number of times, and then subsequently electronically decoded, and presented in a format which is meaningful to the user.

In optical storage systems designed for Read-Only applications, the information is commonly stored on the media in the form of extremely small pits and/or protrusions (relief structures), which are present on a highly reflective background layer on the media. As the media is moved relative to the laser beam, the differences in the reflected light signal due to the presence or absences of these pits and/or protrusions are optically detected; thereby providing the coded signals which may then be electronically decoded. The nature of the detected signal modulation from the encoded structured in these systems is typically due to changes in the phase relationship between the reflected light off the relief structure and that off of the surrounding media. For maximum optical definition of the reflected signal during optical reading of the ROM media, the physical distance between the surface of the information carrying spots and the surface of the surrounding medium should be such that the laser light being reflected off the interface between these surfaces will be approximately 180° out of phase with respect to each other. Destructive interference of the read beam results when the imaged laser spot scans over regions defined by the edges of the information spots; resulting in a decrease in the intensity of the reflected beam.

Typically, these relief structures are borne on grooves and/or ridges which provide tracking information to the servo system of the laser reading apparatus. These tracks accurately guide and focus the laser beam over the spots and thus ensure maximum signal contrast between data points. Generally, the pits and/or protrusions are of uniform width and depth but are often of varying lengths along a defined track. These marks can thus comprise a spatial representation of the temporal variation of a frequency modulated carrier signal for video applications, or alternatively represent a more complex form of digital data encoding.

Read-Only-Memory media such as discs are typically fabricated by compression/injection molding of these pits and/or protrusions and/or tracks into the surface of a substrate material, most commonly of a polymeric composition; or alternatively by a photopolymer process in which a photosensitive lacquer is coated directly onto the substrate. The former requires critical control of temperature and pressure cycles of minimize both the deformation of the disc and inclusion of optical nonuniformities (stress birefringence). These two induced defects are particularly critical for systems that are read through the substrate.

The thus molded surface of the ROM substrate is typically coated with a thin layer of a highly reflective material such as aluminum to provide for a reflective background upon which the incident laser beam can discriminate between the digital signals associated with the pits and/or protrusions. A suitable protective coating is then often applied onto the encoded reflective surface to protect this surface from both mechanical damage and environmental degradation, along with ensuring that any dust contamination or surface scratches will be sufficiently out of focus for those systems in which the laser reading is not done through the substrate.

In addition to ROM media, both Write-Once media; and Write-Read-Erase systems have been recently introduced into the marketplace. Typically, these systems utilize a diode laser to both "read" and "write" coded information from and to the media. Data can be of several forms: that which includes some permanent prerecorded data (similar to ROM) in addition to that which can be permanently formed by the laser through direct or indirect interaction by the user (Write-Once); that in which all the information is recorded by the laser; or that which can be interactively formed and removed by the laser (Write-Read-Erase).

Write-Once applications for optical information storage are often referred to as "direct-read-after-write" (DRAW) or more recently, "write-one-read-many" (WORM) media. In this application, the optical storage media or disc is typically already preformatted with the appropriate tracking and associated access information. Some of the media incorporates suitably reflective and active layer into the multilayered structure.

Write-Once media which supports recording of audio or video signals are called recordable compact disc memory media. In order for media to be recordable on standard equipment under present industry guidelines, such media must have a reflectivity level of about 70% and at the same time be sensitive enough to be written upon at a rate of about 4.3 MHz, which is the sampling rate required for audio/video signal reproduction. At this sampling rate, the sensitivity of the media should be of sufficient degree to allow writability utilizing about a 10 mW laser. To data, no media has been introduced into the marketplace which can meet these criteria. One embodiment of the present invention does posses the capability for recording at about 4.3 MHz using a about a 10w laser at about a 70% reflectivity level.

In the present invention, the reflective and active layer are the same layer, i.e. the alloy. The active layer serves as the medium in which new data can be encoded through interaction with light. For example, a modulated laser beam operates to encode information into this surface by tightly focusing it down to a spot size in which the power per unit area ratio is sufficient to cause a detectable change in the optical characteristics of the active layer on the disc. The nature of the light signal modulation detected during the reading process is typically due to differences in the absorption-reflection coefficients of the material; phase relationships of reflected light; and/or polarization states of the reflected beam.

Typical forms of WORM media (typically grouped together by the mechanism in which the encoding of data is accomplished) include: phase change systems (Blonder et al. U.S. Pat. No. 4,579,807), topography moldifications, magneto-optic media, photochromism, bubble formation, and ablative/melt media. A review of such medias can be found in Wen-yaung Lee, *Journal of Vacuum Technology A*3(3), pp 640–645 (1985). The ablative/melt media is the most commonly practiced form of WORM system. The data is typically stored in the form of small pits or depressions which are created through local heating by the laser radiation of a thin active layer (most commonly of a metal or a metal alloy) to a threshold level in which the material in the active layer begins to melt and/or ablate from the surface of the disc. Ablation in this application means modification of the surface resulting in structural changes that are optically detectable.

Examples of such media typically incorporate tellurium-based alloys as part of the active layer due to its relatively low melting/ablating point. By melting and/or ablating the tellurium alloy in a localized area, a void is produced that exposes the underlying substrate. The void can be optically detected using either of at least two structure configurations.

In the first type, a second substrate is suitably affixed to the first. It is spaced from the first tellurium-coated substrate, so as to provide an air space between the two substrates. Since the tellurium alloy has a smooth reflective surface, the radiation is suitably reflected back off this surface. After void formation, light traverses through the first transparent substrate and is internally reflected and lost in the air space. Thus, the unaltered surface appears reflective and the voids appear dark. This configuration is often called an Air-Sandwich Write-Once Disc (Kenny U.S. Pat. No. 4,074,282 and Lehureau et al. U.S. Pat. No. 4,308,545).

In a second configuration, a low reflective tellurium alloy is deposited on a transparent dielectric which in turn overlies a metallized substrate (e.g. aluminum). This configuration is commonly referred to as an antireflection tri-layer structure. The thickness of the dielectric is carefully chosen to produce destructive interference of the incident light used for reading the information from the disc. Thus, before writing, the medium absorbs nearly all the radiation of the laser reading source. Where the voids are formed, the absence of the tellurium alloy precludes destructive interference of the laser radiation, and light is now reflected from the underlying metal surface.

Both of these configurations represent the digital information in the form of differential absorbing and reflecting areas within the disc and require complex design considerations to meet acceptable signal-to-noise standards.

Despite an extensive research effort, systems which are based on tellurium and alloys thereof exhibit many characteristics which are highly undesirable for commercial WORM systems and cannot be used for recordable compact disc memory media. First of all, alloys of tellurium are typically very unstable upon exposure to oxygen and/or moisture, thus making expensive hermetically sealed disc structures necessary in order to ensure a minimum archivability of the data for at least 10 years( Mashita et al. U.S. Pat. No. 4,433,340). Secondary, the use of tellurium in the fabrication process requires great care due to the inherent toxicity of tellurium and alloys thereof. Additionally, the low light-reflective contrast ratios between the unaltered tellurium film and the laser created voids lead to significant errors in data storage and retrieval. Ideally, contrasts of greater than 5 to 1 are required to give accurate and reliable forms of media. Also, tellurium-based systems typically exhibit about 35% to 40% reflectivity which will not meet standards for recordable compact disc memory media.

Several criteria considerations made during the selection and design of an active layer are strongly dependent on optimizing these contrast ratios within the media. For example, because speed is an extremely important consideration in recording the retrieving data, it is highly desirable that the active thin metal alloys reflective layer, in an ablative/melt type of WORM or recordable compact disc memory media, be of a suitable composition so as to enable the laser to rapidly form the pit or depression as well as to minimize the large energy required. Further, it is important that the active/reflective metal surface area, surrounding the pit thus formed, remain relatively unaffected during data retrieval; as any distruption of this surface will result in degradation of the optical signal during the reading process, thereby leading to an increase in the bit-error-rate (BER) and decreasing the signal-to-noise ratio.

In all of the above referenced applications (ROM, WORM and recordable compact disc memory), it is extremely important that the active reflective surface be uniform and able to provide sharp, clear contrasts between the information spots and surrounding surface in order that the resulting signal-to-noise ratio may be maximized. Further, in order to ensure long term retrievability of the encoded information, it is desirable that the active reflective surface material be highly resistant to corrosion and oxidation, which may result in degradation of the signal. It is important that the reflective material be firmly bonded to the supporting substrate and be dimensionally and environmentally stable. It is also advantageous that the active surface be highly reflective so that a secondary reflecting layer is not required. This results in a lower cost optical storage medium.

SUMMARY OF THE INVENTION

The present invention offers an improved optical memory storage media and method of fabricating the same which may be accomplished easily and inexpensively and yet offers exceedingly good dimensional and environmental stability. The present invention utilizes a substrate to which a thin metal alloy film is bonded. Substrates made of glasses, ceramics, epoxies, plastics, fiber reinforced plastics, metals and composites thereof are suitable for use in this invention.

The highly reflective soft metal alloy comprises at least 5 percent by weight of each of at least two metals selected from the group consisting of cadmium, indium, tin, antimony, lead, bismuth, magnesium, copper, aluminum, zinc and silver.

Preferably the metal alloy consists of about 5 to about 95 percent by weight tin, about 5 to about 95 percent by weight bismuth, and 0 to about 40 percent by weight copper.

More preferably the soft metal is an alloy of the medium wherein the soft metal is an alloy of about 5 to about 95 percent by weight tin, about 5 to about 95 percent by weight bismuth and 0 to about 40 percent by weight copper; an alloy of about 5 to about 95 percent by weight tin, about 5 to about 95 percent by weight bismuth, 0 to about 49.9 percent by weight silver; an alloy of about 5 to about 95 percent by weight zinc, about 5 to about 95 percent by weight cadmium and 0 to about 49.9 percent by weight silver; an alloy of about 5 to about 95 percent by weight zinc, about 5 to about 95 percent by weight cadmium and 0 to about 10 percent by weight magnesium; an alloy of about 0.1 to about 95 percent by weight tin and about 5 to about 99.9 percent by weight of indium; an alloy of about 5 to about 95 percent by weight tin, about 5 to about 95 percent by weight lead, and 0 to about 40 percent by weight copper; an alloy of about 5 to about 95 percent by weight tin, 5 to 95 percent by weight lead and 0 to 49.9 percent by weight silver.

The metallized composition is particularly well suited for manufacturing in sheet form and offers a very high degree of surface uniformity and reflectivity. In one embodiment for ROM's, the tracks and/or encoded information may be embossed directly onto a metallized, deformable (e.g. plastic) substrate surface of the composition. Embossing pre-formed substrates (e.g. discs), metallized with the metal alloys of this invention, is also envisioned. In another embodiment for ROM, the tracks and/or encoded information are produced by conventional processes, e.g injection molding and the surface is subsequently metallized with the alloy of the invention, the improvement being a more corrosion-resistant ROM media. In another embodiment for WORM and a further embodiment for recordable compact disc memory, the tracking formatting and/or any permanent information or data would be embossed onto the discs in the manner as described for ROM's, or by other currently practiced manufacturing methods as previously described, but space would be reserved for new laser written information to be encoded on the disc. Such methods may be non-embossing and include such substrates as glasses, ceramics, epoxies, plastics, fiber reinforced plastic and composites thereof. All types of media, ROM, WORM, recordable compact disk memory and any combination thereof could be manufactured, in accordance with the methods of the present invention, to conform to current laser read/write systems for any size, shape or form of media (i.e. disc, card, tape, etc.).

Because the metal alloy in the present invention is securely bonded to the substrate surface and is relatively soft, it is possible to emboss this coded information directly onto the metallized surface by means of either a continuous sheet process or in a batch-like operation. Coded information is thus encoded into the metal/deformable sheet composite by displacement of portions of the composite. The thus formed discs may then be cut from the sheet stock by some suitable process, provided with a protective coating, labelled, etc. for a complete "ROM" and/or "WORM" system. The ability to continuously form and metalize the sheet stock from which the completed discs are cut offers significant cost advantages over the conventional processes presently being utilized for the fabrication of these ROM and WORM discs. Furthermore, the metal alloy of the present invention exhibits superior corrosion resistance as well as other important and highly desirable features. Therefore, media (e.g. discs) with improved durability can be achieved using the alloys of this invention. Such media (e.g. discs) can be manufactured via a sheet process as described above, or by an injection molding process, 2P-process or any other process such as etching a hard epoxy, glass, ceramic, fiber reinforced plastic or metal substrate and then applying the alloys of this invention.

Additional advantages and features of the present invention will become apparent from the subsequent description and the appended claims taken in conjunction with the accompanying drawings.

DESCRIPTION OF THE PREFERRED EMBODIMENT

Figure 1:
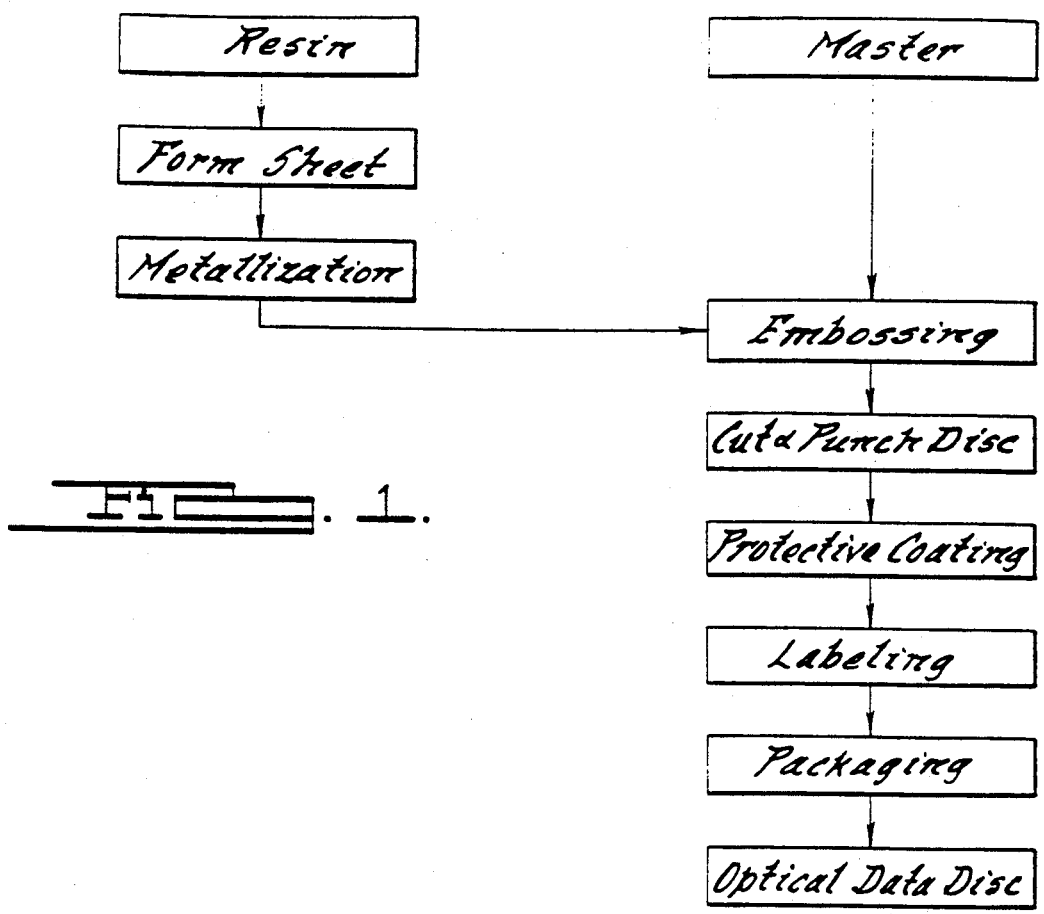
FIG. 1 is a schematic diagram illustrating one of the possible manufacturing schemes for fabricating optical media (e.g. discs) using a continuous sheet process with the materials of the present invention.
Figure 2:
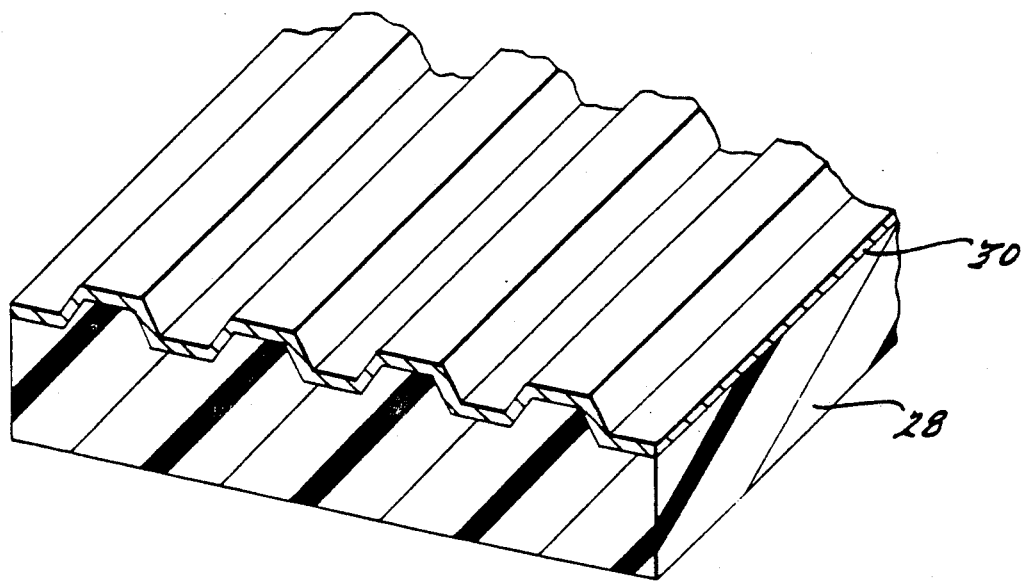
FIG. 2 is an enlarged fragmentary sectional view of such an optical medium (e.g. a disc) manufactured in accordance with the method of the present invention of which a segment has been formatted with the appropriate tracking grooves which may be concentric, spiral or divided into a number of quasi-concentric tracks.

The present invention comprises multi-layer metal/-substrate compositions and their method of manufacture. The invention is directed to the use of certain metal alloys such as were previously developed for use in applications such as the manufacture of reflective and decorative parts for automobiles and other transportation vehicles which now offer a highly advantageous material for use in the fabrication of optically readable and/or writable data storage materials. These compositions and the manner by which they may be fabricated are disclosed in Kurfman et al. U.S. Pat. No. 4,115,619, issued Sept. 19, 1978; Kurfman et al. U.S. Pat. No. 4,211,822, issued July 8, 1980; Marton et al. U.S. Pat. No. 4,241,129, issued Dec. 23, 1980 and Kurfman U.S. Pat. No. 4,510,208, issued Apr. 9, 1985; the disclosure of which are hereby incorporated by reference. Each of these patents deals specifically with the fabrication of a polymer substrate having bonded to one surface thereof a metal alloy in which the metal alloy exhibits an extremely high degree of reflectivity which is not lost during subsequent forming operations performed on the metallized surface.

Lurfman et al. U.S. Pat. No. 4,115,619 discloses a multilayer metal/organic polymer composite and articles thereof provided by metallizing a polystyrene or polycarbonate film. Such metal alloy may comprise at least 50% by weight of one or more of antimony, indium, bismuth, tin, zinc, cadmium and lead; from about 10% by weight of one or more of silver, copper, gold, aluminum and magnesium. More preferably, such metal alloy may comprise 5-95% tin, 5-95% bismuth and 0-40% copper. Kurfman, et al. U.S. Pat. No. 4,211,822 discloses metal/polymer composites and articles thereof wherein the soft metal alloys employ 25-90% tin, 8-60% bismuth and 1-25% copper.

Marton et al. U.S. Pat. No. 4,241,129 discloses a multilayer metal/organic polymer composite structure wherein the organic polymer is polycarbonate, thermoplastic polyester, acrylic resin, monovinylidene aromatic polymer, a polymer of vinyl chloride or vinlydiene chloride, or acetal resin. The metal is indium or an alloy of at least two of cadmium, indium, tin, antimony, lead, bismuth, magnesium, aluminum, zinc, copper or silver. The polymer layer may comprise a soft adhesive polymer which is a diene rubber, or a block copolyemr having polysturene blocks, as well as, blocks of polybutadiene, polyisoprene, flexible polyurethanes and other thermoplastic rubber polymers. The alloy layer comprises 5% to about 95% tin, 5% to about 95% bismuth and from about 0% to 40% copper by weight.

Kurfman et al., U.S. Pat. No. 4,510,208 discloses a multilayer metal/organic polymer composite wherein the formable layer is a thermoplastic to which is adhered a first metal layer formed from an alloy of two or more metals and second metal layer adhered to the first metal layer formed from one metal or an alloy of two or more metals. The alloy of the first layer is formed from two or more metals selected from the group consisting of cadmium, indium, tin, antimony, lead, bismuth, or zinc and contains 5 to about 40 percent by weight of copper. The alloy of the second metal layer is formed from two or more metals selected form the group consisting of cadium, indium, tin, antimony, lead, bismuth, and zinc. The alloy of the second metal comprises at least 30 weight percent tin and at least 40 weight percent bismuth.

It has been found that the alloys disclosed in these above referenced patents exhibit very low melting points, Additionally, this alloy has been shown to have an extremely low corrosion rate, thus lending itself well to long term storage of such encoded information without degradation of the signal-to-noise ratio during the repetitive reading thereof. In addition to a low melting point, it is desirable that the material have a relatively low coefficient of thermal diffusivity such that heat generated during a writing process will not be dissipated to the adjacent substrate layers nor propagate laterally to thus enlarge the spot size, but rather will result in the formation of a clean, distinct spot in the active metal layer.

Additionally, the metal alloy must be such as to have an appropriate surface tension such that upon application of a write laser beam, the spot will be defined by clean edges and thus provide a sharp, clear signal during a read process. The alloy must also be capable of being easily and strongly bonded to the substrate and must be capable of being deposited upon the substrate so as to form a microscopically uniform and continuous layer thereon. Unexpectedly, virtually all of these highly desirable attributes have been found to be present in the materials disclosed in the above referenced patents.

Additionally, the process for fabricating such metal/-substrate composites has been shown to be suitable for fabrication in both a continuous sheet process in which the sheet comprises the substrate material, or alternatively, fabricated into a thin film metal/polymer composite which is then suitably laminated in some suitable fashion to the substrate material. In one embodiment, the metal alloy is further secured to the substrate via an intermediate layer of copper. This is a copper tie arrangement. The substrate may be any material to which the metal alloy may be adhered and which provides the mechanical strength to support the alloy. Glasses, ceramics, plastics, fiber reinforced plastics, epoxies, metals and composites thereof can be used as the substrate.

Referring now to FIG. 1, one possible method of the present invention is illustrated by which an optically readable and/or writable data storage disc may be easily and uniquely fabricated. In this illustrated method, a polymeric composition substrate which may be of any suitable composition such as a polycarbonate material, PMMA, polystyrene, etc. is formed using a continuous or semicontinuous sheet process. This sheet may be formed by an extrusion or other sheet forming process in a continuous forming operation or formed off-line. A very thin film of metal alloy is deposited on the surface, such as by a vacuum vapor deposition process or a sputtering technique, Berg et al. U.S. Pat. No. 4,107,350. The fabrication of metallized sheet stock in this manner offers significant advantages over the currently employed techniques for manufacturing such optical discs in that it would not only improve productivity, resulting in substantial cost savings, but many desirable quality control checks can be performed on the sheet prior to the embossing thereon of the coded information, thus substantially reducing the investment of valuable production time in the fabrication of discs which may ultimately be rejected.

The sheet stock may then be subjected to an embossing process wherein either one or any combination of tracking information, formatting information and/or digital coding information may be directly imprinted on the metal surface thereof. Typically this embossing operation may be performed with a master stamper of the type illustrated in either FIGS. 3 or 4 and indicated by reference numbers 10 and 12 respectively, wherein the digital coded information is represented by the protrusions 14 or less reflective spots (e.g. holes) 16 provided in the respective surfaces 18 and 20 of the stampers 10 and 12 and the contour of the stamper provides the desired formation of tracks on the surface of the sheet stock.

As shown therein, one form of such tracks comprise alternating raised and depressed surfaces 17, 18 and 20, 21 respectively interconnected by inclined sidewalls 22, 24 respectively. In the case of disc type storage media, these tracks may be in the form of gradually radially inwardly moving spirals. Also as shown in FIGS. 3 through 6, the coded information represented by protrusions 14 or depressions 16 on the stampers 10 and 12 respectively may be formed on either the raised or depressed surfaces.

The desired stamper is typically placed in a suitable thermoforming system (i.e. an embossing wheel, continuous thermoforming system, or any other suitable mechanical arrangement), which is then operated to thermally form the sheet stock thereby imprinting the tracking and coded information in the surface thereof. Because of the high degree of formability of the metal/polymer composition included in the present invention, without significant loss in spectral reflectivity, this operation is well suited for thermoforming optical memories out of the previously metallized sheets.

Figure 3:
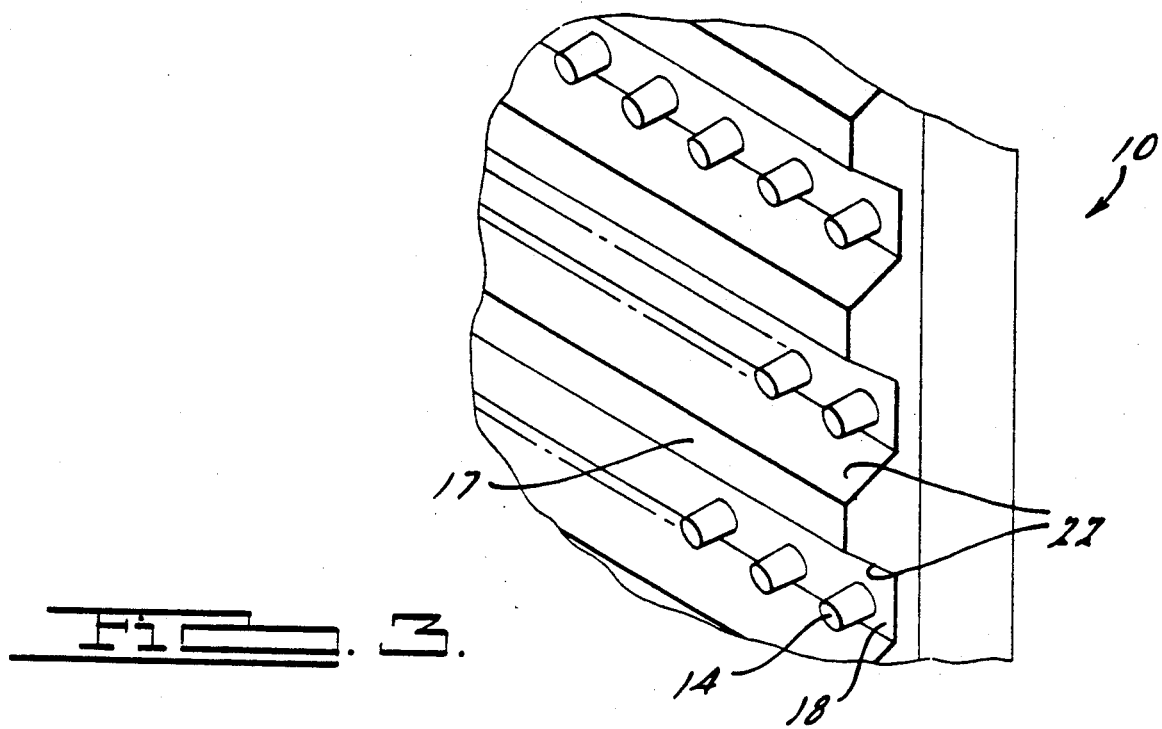
FIG. 3 is an enlarged fragmentary perspective view of a portion of a stamper utilized for embossing the digitally coded information onto the metallized layer of medium (e.g. a disc) in accordance with the present invention.
Figure 5:
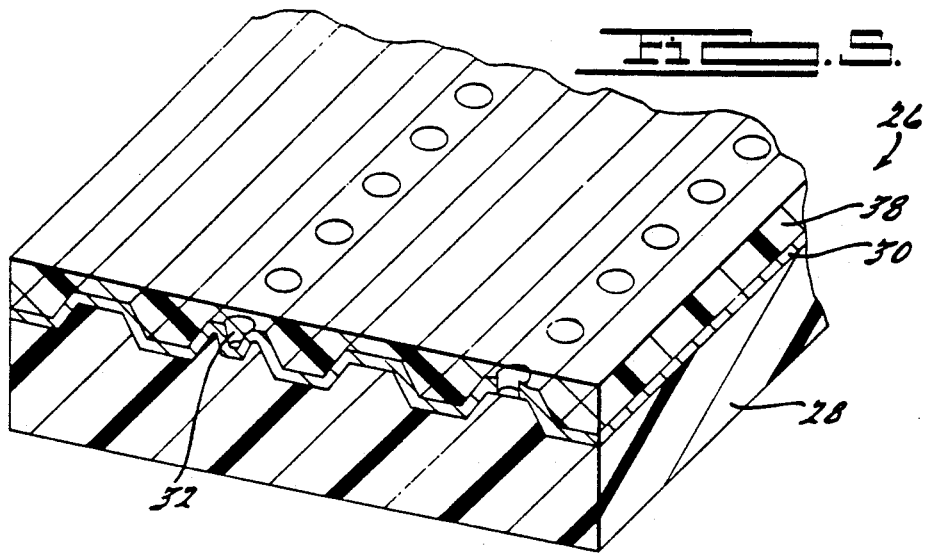
FIG. 5 is a fragmentary perspective view of a medium (e.g. disc) similar to that illustrated in FIG. 2 but showing digital information imprinted on respective tracks both by means of embossing as well as by means of an ablative laser process.

FIG. 5 illustrates a portion of medium (e.g. a disc) 26 which has been formed in part by use of the stamper 10 illustrated in FIG. 3. As shown therein both the substrate 28 and metal coating 30 have been formed from the original flat planar form to provide the desired tracks and coded depressions 32.

Figure 4:
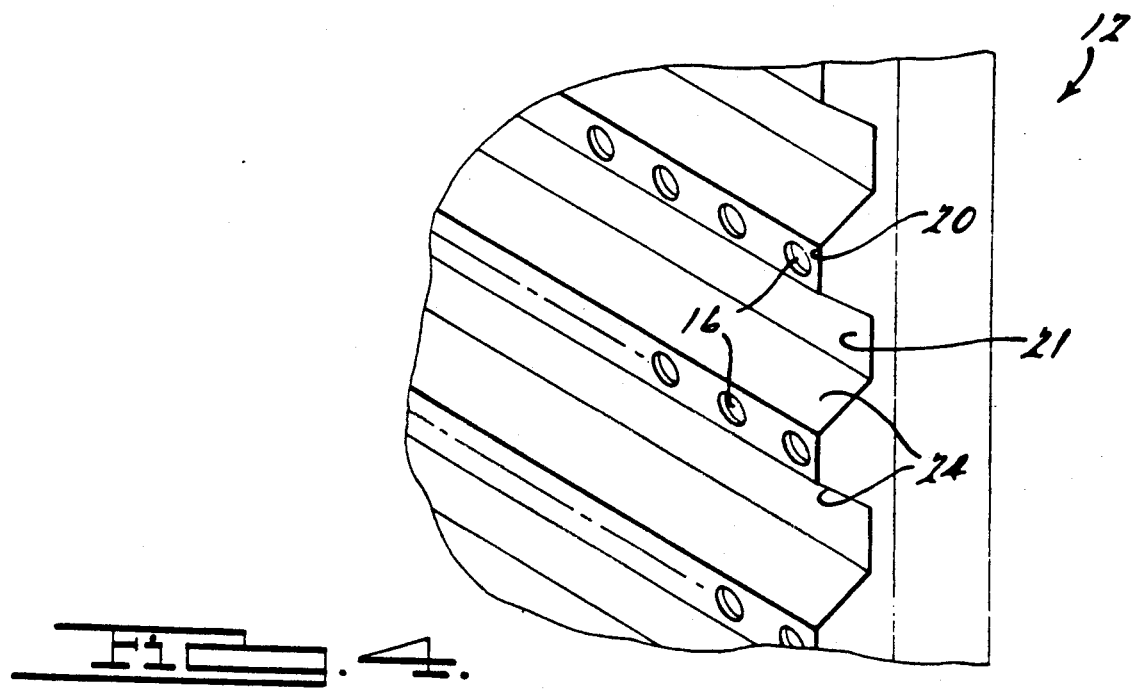
FIG. 4 is a view similar to that of FIG. 3 but illustrating another form of a stamper for use in embossing the coded information on such media (e.g. discs)
Figure 6:
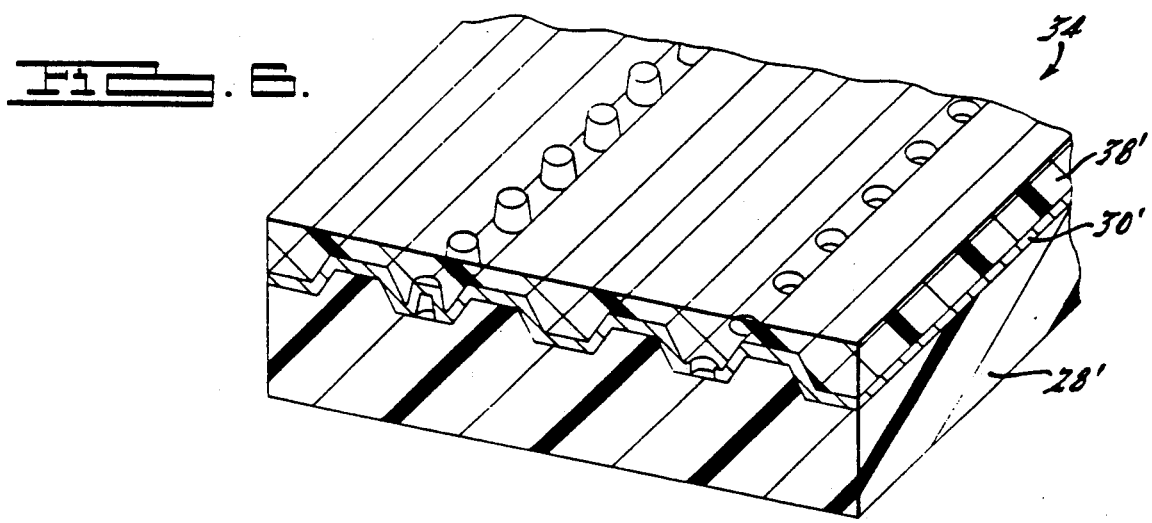
FIG. 6 is a view similar to FIG. 5 but showing the coded information positioned in the valleys of the tracks.

Similarly, FIG. 6 illustrates a portion of medium (e.g. a disc) 34 which has been formed in part by use of the stamper 12 illustrated in FIG. 4 and includes tracks and coded projections 36.

The sheet stock may hereafter be cut and/or punched to remove the thus embossed medium (e.g. a disc) therefrom after which a suitable relatively thin protective coating represented by reference number 38 and 38' in FIGS. 5 and 6 respectively) will be applied to the metallized surface 28 and 28' respectively. The thus formed media (e.g. discs) may be then suitably labeled and packaged for commercial shipment.

It should be noted that the forming of the tracks and digital information may be done in a continuous process, such as the one discussed above and illustrated in FIG. 1, or in any of a number of continuous schemes which may include lamination of an embossed film onto a substrate, or some semicontinuous process in which each step is sequentially carried out, or in a conventional batch process in which blank discs are produced by injection molding, metallized with an alloy of the present invention, and then embossed with the digital information and/or tracks.

Figure 7:
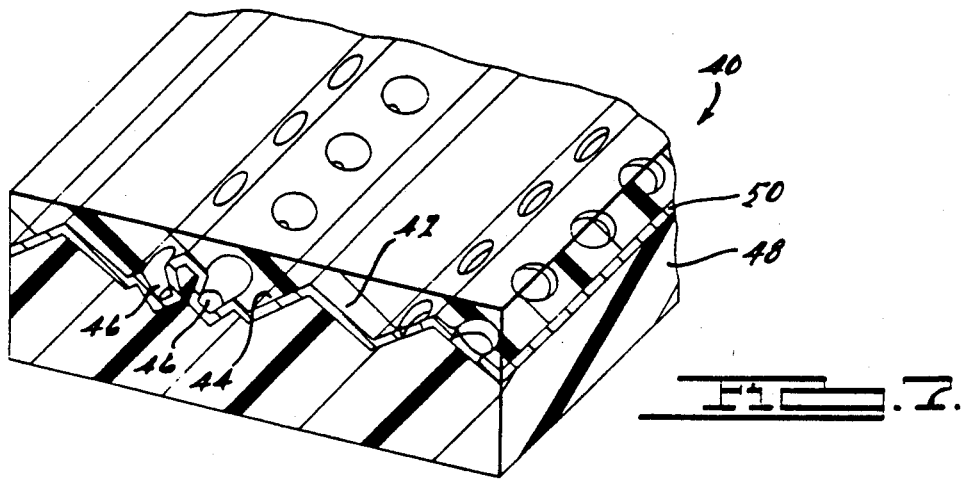
FIG. 7 is also a view similar to that of FIGS. 5 and 6 but illustrating coded information imprinted on an alternative tracking arrangement.

FIG. 7 illustrates a segment of medium (e.g. a disc) 40 similar to those illustrated in FIGS. 5 and 6 but showing a different tracking format wherein the surface contour contains inclined walls 42, 44 each of which may carry encoded information in the form of depressions 46. This medium (e.g. a disc) 40 also includes a polymeric substrate 48 having a like metal alloy coating 50 applied thereto similar to that described above.

Figure 8:
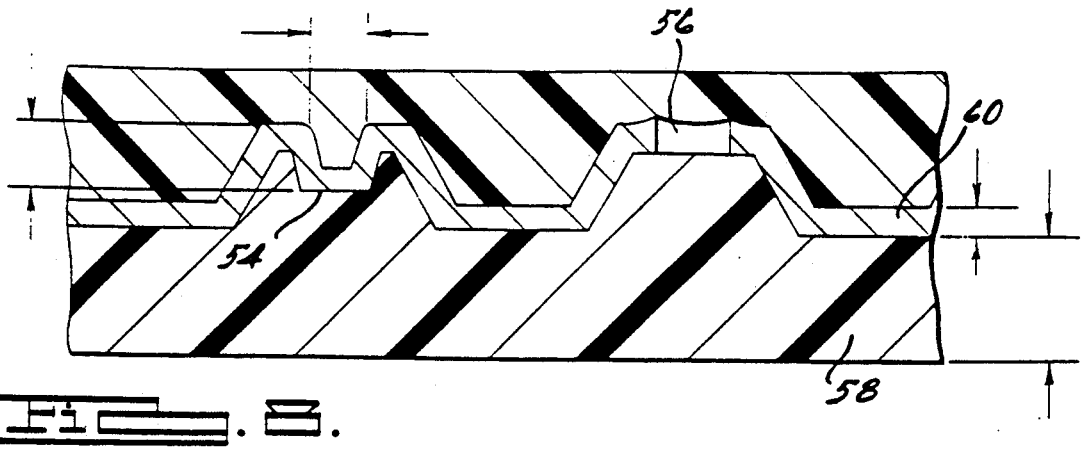
FIG. 8 is an enlarged sectional view through a portion of an optical medium (e.g. disc) illustrating two forms by which the encoded information is presented on media (e.g. discs), all in accordance with the present invention.

Referring now to FIG. 8, there is shown an enlarged detail sectional view of a portion of medium (e.g. a disc) 52 having the coded information provided on the surface thereof in the form of both embossing spots 54 as well as by use of an ablative laser writing process 56. As noted therein, these spots 54 and 56 which represent this code information are extremely small, typically being on the order of about 0.8 micrometers in diameter and on the order of about 0.05 to about 0.5 microns in depth for molded spot 54. More precisely, the width of these spots should be on the order of about $\frac{1}{2}$ of the beam diameter of the laser, and a depth on the order of about $(2n-1)\lambda/4$, where n is an integer and $\lambda$ is the wavelength of the laser beam. This extremely small size enables a vast amount of coded information to be placed upon a relatively small surface area, thus affording such optically readable media (e.g. discs) an extremely high density level of data storage. Also shown in FIG. 8 is one typical configuration for a tracking guide. The width of said guide is preferably on the order of about $\frac{1}{2}$ the diameter of the incident laser beam and a depth on the order of about $((2n-1)\lambda/4)-\lambda/8$.

Also, as shown in FIGS. 5 through 8, the substrate 28, 28', 48 and 58 to which the metallized layer 30, 30', 50 and 60 is applied will preferably be on the order of about $1 \times 10^{-6}$ to about $1 \times 10^{-1}$ meters and most preferably from about 0.1 to about 5 millimeters in thickness. The metal alloy film will preferably have a thickness in the range of from about 20 to 10,000 Angstroms and more preferably from about 20 to about 2000 Angstroms. In some preferred thin film embodiments, the metal alloy film will have a thickness in the ranges of 80 to 320 Angstroms and 200 to 320 Angstroms and 260 to 320 Angstroms. In other embossable embodiments, the metal alloy film will preferably be in the range of 100 to 2000 Angstroms.

As disclosed in the aforementioned referenced patents incorporated herein by reference, the metal alloy will preferably consist of at least five percent by weight of at least two of the following metals: cadmium, indium, tin, antimony, lead, bismuth, magnesium, copper, aluminum, zinc, or silver; and most preferably consist of from about 70 percent to about 75 percent by weight tin, from about 20 percent to about 25 percent by weight bismuth; and 0 percent to 5 percent, preferably about 5 percent by weight copper. In thermal forming of the sheet stock, it has been found that the press platens may be heated to a temperature of from about 30 to about 340 degrees centigrade with a pressure in the range of from about 10 to about 500 pounds per square inch. The time for forming will vary depending upon many factors and typically may be accomplished in from about 0.5 to about 60 seconds total duration.

As described above, the medium (e.g. discs) formed in accordance with the method of the present invention may be encoded by means of a master stamper. Therefore, these same media (e.g. discs) are extremely well suited for use in ROM, WORM or recordable compact disc memory applications or any combination thereof.

Figure 9:
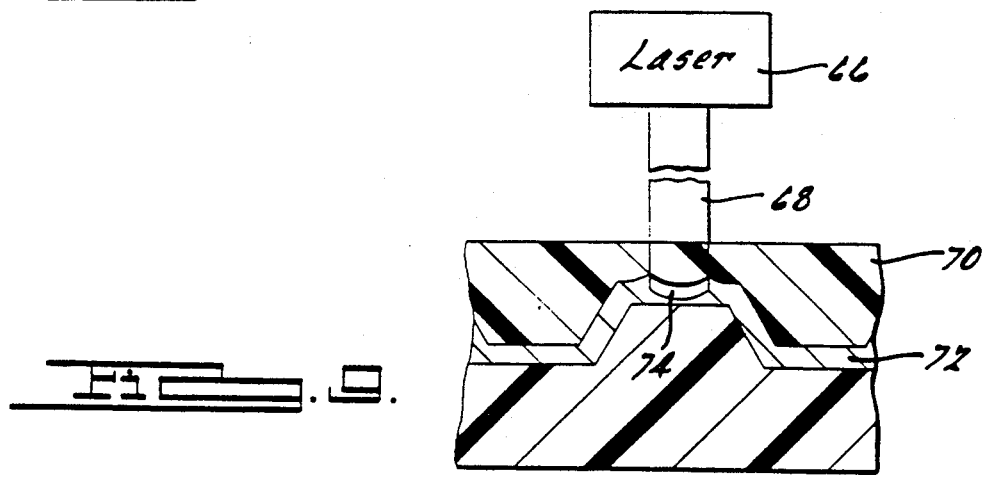
FIG. 9 is a schematic view illustrating the process by which a laser beam is utilized in order to create the spot illustrated in FIG. 8.

FIG. 9 diagrammatically illustrated a process whereby a laser 66 is emitting a highly focused light beam 68 which passes through protective layer 70 and impinges on the metal active layer 72. This beam 68 causes a rapid localized heating of this metal layer 72 such that a less reflective spot (e.g. hole) 74 (shown partially forward) is formed therein. During such writing operations, the thermal properties of the metal will result in a melting/ablating of the area immediately within the maximum beam intensity from the laser with the end result that surface tension of the alloy will cause a pit to form and the surrounding area to form a rim around the thus formed spot. Of course, the laser beam can be focused on the metal active layer 72 through the substrate if desired.

In addition to the method of the present invention, media of any form using the alloy of this invention can be molded by conventional injection molding techniques and/or other techniques currently in practice. The selection of materials for use in such WORM and recordable compact disc memory (e.g. discs) is extremely important as it is very important that the laser be able to create the mark, or spot on the surface of the active layer very rapidly and that the resulting spot be extremely well defined so as to produce a relatively high signal-to-noise ratio during the resulting playback operation. Further, it is important to control the thickness of the active metal layer so as to minimize the amount of power required for the laser to effectively write the coded information on the disc. Of course, it is necessary to maintain a sufficient thickness of such alloy, such that a minimum differential between the power required to write on the optical disc and the power employed during a read operation is achieved, such that the read operation power level does not result in any degradation of the alloy film during the reading process.

Figure 10:
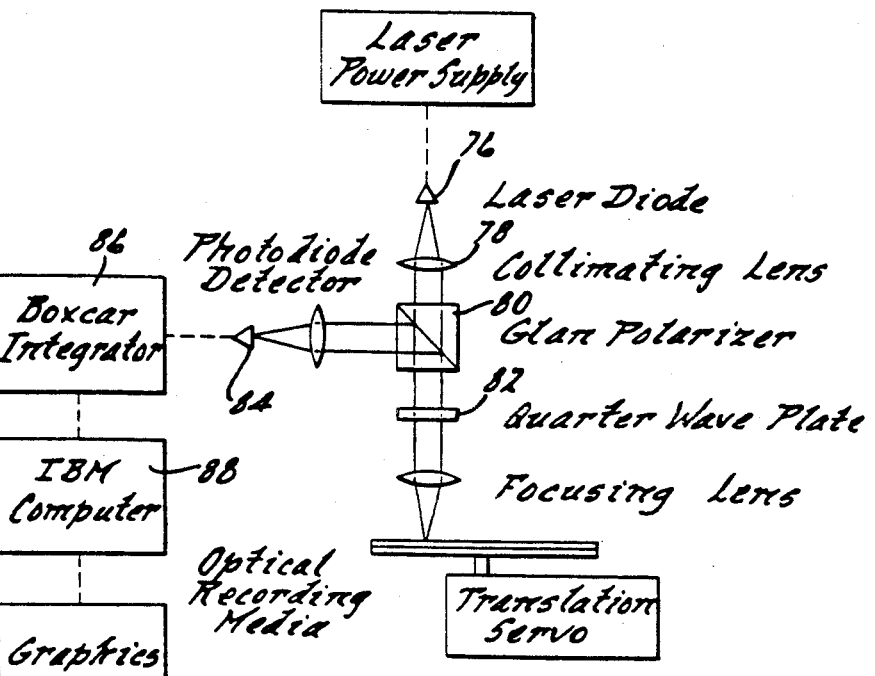
FIG. 10 illustrates in diagrammatic form the testing apparatus utilized in evaluating the optical quality of the metal/polymer composite surface which is physically altered in accordance with the present invention.
Figure 11:
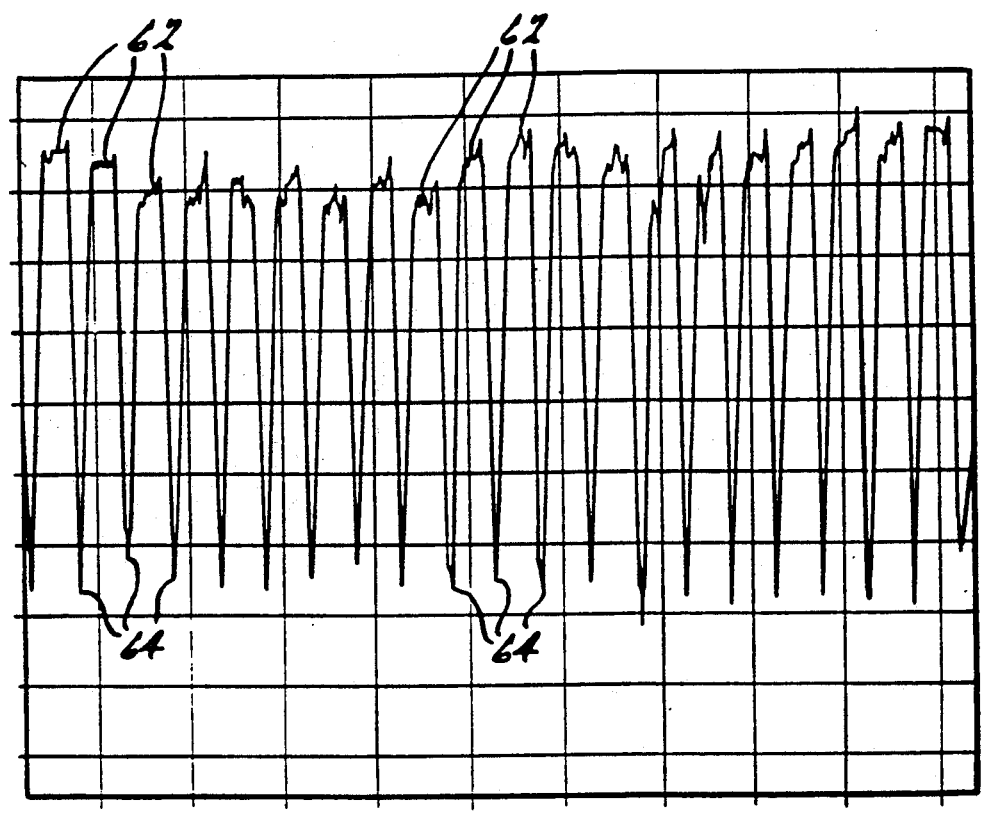
FIG. 11 is a graph illustrating the high degree of reflectivity difference between the spots and surrounding surface of media (e.g. discs) manufactured in accordance wit the present invention.

FIG. 11 shows a readout from the optical disc testing apparatus illustrated in FIG. 10 indicating the difference in optical signal as read by the test apparatus. As is clearly illustrated therein, there is sharp differential between the signal measured from the unmarked surface (indicated at the top portions of the graph by reference number 62) of the disc and the spots either embossed or laser written thereonto (indicated at the lower portions of the graph by reference number 64). This difference is denoted by the sharp downwardly extending spikes shown in this graph. The slight unevenness of the surface topography of the formed disc results in the noise level shown along the top portion (in the areas designated by reference number 62) of this graph.

In the examples in which the work was actually performed in developing and evaluating the present invention, the following conditions prevailed, Film thicknesses were determined using a R. D. Mathis TM-100 thickness monitor. The crystal sensor was placed in close proximity, and in the same plane, as the substrate material to be coated. A material density of 7.80 grams per cm$^3$ and an acoustic impedance of $6.15 \times 10^5$ gm/(cm$^2$sec) were used in determining the thickness for alloys.

EXAMPLE 1

A commercial, $1 \times 10^{-3}$ meter thick, polycarbonate sheet (Lexan ™) was used as the polymeric substrate. It was cleaned by gentle rubbing with an optical lens paper soaked in a methanol/water solution. The sheet was then dried in a vacuum oven for 24 hours at 100 degrees centigrade.

A 3 inch by 3 inch square sample of the substrate material was coated with a 200 Angstrom thick film of a metal alloy consisting of tin/bismuth/copper in a weight percent composition of 75/20/5, respectively. The coating was done by rapid thermal evaporation of the alloy in a conventional Bell Jar vapor-deposition apparatus. A 0.02 gram wire sample of the alloy was resistively heated in a 1.5 centimeter tungsten boat using 120 amperes of current to evaporate the alloy. The background pressure in the system was $8 \times 10^{-6}$ millimeters of mercury. The thickness and rate of deposition of the film were monitored by an oscillating quartz crystal sensor.

The resulting metallized plastic sheet was subsequently embossed with a rigid nickel/copper stamper which contained digital information of several sizes etched into its surface. The stamper consisted of four quadrants of circularly shaped, one micron deep, less reflective spots (e.g. holes) (5, 7, 10, and 15 microns in diameter, respectively). This metal stamper was fabricated by Photo Sciences Inc., Torrance, Calif.

A thermally controlled parallel plate hydraulic press was used to emboss the digital information contained on the stamper into the metallized plastic composite. The press platens were heated to 180 degrees centigrade and the pressure adjusted to 150 pounds per square inch. Total embossing time was 30 seconds. After embossing, the metallized plastic sheet was separated from the stamper and allowed to cool.

The resulting media displayed an accurate mirror image representation of the stamper suitable for optical memory applications. Scanning electron micrographs show a contiguous film of the metal alloy throughout the surface of the substrate.

EXAMPLE 2

A polycarbonate substrate, similar to that described in Example 1, was coated with a 2000 Angstrom thick film of a metal alloy consisting of tin/bismuth/copper in a weight percent composition of 70/25/5, respectively. The coating was done by rapid thermal evaporation of the alloy in a continuous roll-to-roll operation. A portion of the resulting metallized plastic sheet was subsequently embossed with the rigid metal stamper described in Example 1.

A parallel plate hydraulic press was used to emboss the digital information contained on the stamper into the metallized plastic composite. The press platens were heated to 200 degrees centigrade and the pressure adjusted to 300 pounds per square inch. Total embossing time was 18 seconds. After embossing, the metallized plastic sheet was separated from the stamper and allowed to cool.

The resulting media displayed an accurate mirror image representation of the stamper. Scanning electron micrographs show a contiguous film of the metal alloy throughout the surface of the disc. Scanning laser analysis of the embossed digital information showed that an accurate reproduction of the stamper had been achieved.

EXAMPLE 3

A 2 inch by 4 inch by 0.125 inch polymethylmethacrylate (PMMA) substrate was prepared and cleaned in a similar sequence to that of the polycarbonate substrates in Example 1. This substrate was coated with a 200 Angstrom thick film of a metal alloy consisting of tin/bismuth/copper in a weight percent composition of 75/20/5, respectively. The coating was done by rapid thermal evaporation of the alloy in a conventional Bell Jar vapor-deposition apparatus.

A diode laser read/write system, schematically illustrated in FIG. 10, was used to ablatively write digital information, approximately 0.9 microns in diameter, onto the metallized plastic composite. The laser apparatus consisted of an intensity modulated Ortel 30 milliwatt GaAlAs semiconductor laser (indicated by reference number 76). The output is collimated and directed through a Glan-Thompson polarizing prism and quarter-wave-plate (reference numbers 78, 80 and 82 respectively). The polarized beam is then tightly focused and imaged onto the metallized plastic composite. Laser radiation which is reflected off the surface of the composite passes back through the optical elements and is split out by the aforementioned polarizing prism (80) and directed onto a photodiode detector (reference number 84). The reflected light signal is processed by an integrating boxcar system (86) and then computer analyzed and displayed using commercial software and hardware (Stanford Research Corporation) together with an IBM Personal Computer (88).

Playback ratios of greater than 30 to 1 were typically measured for spots created using pulse durations of 1000 nanoseconds at 10 milliwatts laser power. A write/read playback threshold value of approximately 1 milliwatt laser write power was observed for this system. The power level for the read laser was kept well below 0.1 milliwatts.

Microscopic analysis of the spots revealed a well defined smooth pit surrounded by a raised rim structure.

EXAMPLE 4

A commercial, $1 \times 10^{-3}$ meter thick, polycarbonate sheet (Lexan TM) was used as the polymeric substrate. It was cleaned by gentle rubbing with an optical lens paper soaked in a methanol/water solution. The sheet was then dried in a vacuum oven for 24 hours at 100 degrees centigrade.

This uncoated polymeric sheet was subsequently embossed with a rigid metal stamper which contained digital information etched into its surface. The stamper consisted of four quadrants of circularly shaped, one micron deep, less reflective spots (e.g. holes) (5, 7, 10, and 15 microns in diameter, respectively).

A parallel plate hydraulic press was used to emboss digital information contained on the stamper into the bare plastic substrate. The press platens were heated to 200 degrees centigrade and the pressure adjusted to 300 pounds per square inch. Total embossing time was 30 seconds. After embossing, the plastic sheet was separated from the stamper and allowed to cool.

The resulting media displayed an accurate mirror image representation of the stamper.

The embossed substrate was coated with a 600 Angstrom thick film of a metal alloy consisting of tin/bismuth/copper in a weight percent composition of 75/20/5, respectively. The coating was done by rapid thermal evaporation of the alloy in a conventional Bell Jar vapor-deposition apparatus. The background pressure in the system was $8 \times 10^{-6}$ millimeters of mercury. The thickness and rate of deposition of the film were monitored by an oscillating quartz crystal sensor.

The following Examples, 5-15, while not actually having been performed, are believed to be operable in producing optical memory storage media efficiently and inexpensively.

EXAMPLE 5

A polycarbonate, PMMA, polystyrene, or any other material of suitable composition used in sheet form may be used as the substrate with a thickness preferably in the range of from $1 \times 10^{-4}$ to $5 \times 10^{-3}$ meters. The plastic sheet is preferably formed in a clean environment to give optically clean materials and will be handled in a clean environment subsequently thereafter.

The substrate is then preferably coated with a 20 to 2000 Angstrom thick film of a metal alloy consisting of cadmium, indium, tin, antimony, lead, bismuth, magnesium, copper, and silver in a weight percent composition of alloys containing at least five percent of at least two of the metals listed.

The coating is preferably done by rapid thermal evaporation of the alloy in a conventional Bell Jar vapor-deposition apparatus or by reactive sputtering.

The resulting metallized plastic sheet may then be embossed with a rigid metal stamper which will contain digital information etched into its surface.

A continuous-feed thermoforming system is preferably used to emboss the digital information contained on the stamper onto the metallized plastic composite. The system platens are preferably heated from about 30 to 450 degrees centigrade and the pressure adjusted to between 10 and 5000 pounds per square inch. Total embossing time is preferably between 0.5 to 60 seconds.

EXAMPLE 6

A polycarbonate, PMMA, polystyrene, or any other material of suitable composition in sheet form may be used as the substrate, preferably having a thickness in the range from $1 \times 10^{-4}$ to $5 \times 10^{-3}$ meters. The plastic sheet is preferably formed in a clean environment to give optically clean materials and will be handled in a clean environment subsequently thereafter.

The substrate is preferably coated with a 20 to 2000 Angstrom thick film of a metal alloy consisting of cadmium, indium, tin, antimony, lead, bismuth, magnesium, copper, and silver in a weight percent composition of alloys containing at least five percent of at least two of the metals listed.

The coating is preferably done by rapid thermal evaporation of the alloy in a conventional Bell Jar vapor-deposition apparatus or by sputtering.

A diode laser read/write system is preferably used to ablatively write micron sized digital information onto the metallized plastic composite and then interactively read back the information.

Playback ratios of greater than 50 to 1 are believed obtainable for spots created using pulse durations of 10 to 1,000,000 nanoseconds at 0.5 to 30 milliwatts laser power. The power level for the read laser should be kept well below 0.001 to 0.5 milliwatts.

EXAMPLE 7

A polycarbonate substrate, similar to that described in Example 1, may be coated with about a 200 Angstrom thick film of a metal alloy consisting of tin/bismuth/copper in a weight percent composition of 70/25/5, respectively.

The resulting metallized plastic sheet may then be embossed with the rigid metal stamper which contains spiral or concentric formatting tracks etched into its surface. Preferably, the stamper consists of 0.1 micron deep tracks which are about 1.5 microns wide.

A parallel plate hydraulic press is preferably used to emboss the tracking information contained on the stamper onto the plastic sheet. The press platens are preferably heated to about 180 degrees centigrade and the pressure adjusted to 150 pounds per square inch. Total embossing time will be about 30 seconds. After embossing, the metallized plastic sheet may be separated from the stamper and allowed to cool. It is anticipated that the resulting media will display an accurate mirror image representation of the stamper.

A diode laser read/write system may then be used to ablatively write micron sized digital information into the formatted metallized plastic composite.

Playback ratios of greater than 30 to 1 are anticipated for spots created using pulse durations of about 1000 nanoseconds at about 10 milliwatts laser power. A write/read playback threshold value of about 1 milliwatt laser write power is expected to be observed for this system. Threshold values will be expected to be a function of film thickness. The power level for the read laser should be kept well below about 0.1 milliwatts.

Microscopic analysis of the spots are expected to reveal a well defined smooth pit sitting on the track.

EXAMPLE 8

A polycarbonate substrate, similar to that described in Example 1, is preferably coated with about a 200 Angstrom thick film of a metal alloy consisting of tin/bismuth/copper in a weight percent composition of 75/20/5, respectively.

This resulting metallized plastic sheet may then be embossed with a rigid metal stamper containing spiral or concentric formatting tracks along with digital information etched into its surface. The stamper preferably consists of about 0.1 micron deep tracks which are about 1.5 microns wide and about 0.13 micron deep pits and/or protrusions (0.8 microns in diameter) situated on top of these tracks.

A parallel plate hydraulic press is preferably used to emboss the tracking information contained on the stamper into a plastic sheet. The press platens are heated to about 180 degrees centigrade and the pressure adjusted to about 150 pounds per square inch. Total embossing time is expected to be about 30 seconds. After embossing, the metallized plastic sheet is separated from the stamper and allowed to cool. The resulting media will display an accurate mirror image representation of the stamper.

A diode laser read/write system may be used to ablatively write micron sized digital information into the formatted metallized plastic composite.

Playback ratios of greater than 30 to 1 are expected to be measured for spots created using pulse durations of about 1000 nanoseconds at about 10 milliwatts laser power. A write/read playback threshold value of about 1 milliwatt laser write power is anticipated to be observed for this system. Threshold values are expected to be found to be a function of film thickness. The power level for the read laser should be kept well below about 0.1 milliwatts.

It is believed that microscopic analysis of the spots will reveal a well defined smooth pit sitting in the track.

EXAMPLE 9

A polycarbonate substrate, similar to that described in Example 1 is to be used as the substrate.

The uncoated polymeric sheet is subsequently embossed with a rigid metal stamper which contains spiral or concentric formatting tracks etched into its surface. The stamper preferably consists of about 0.1 micron deep tracks which are about 1.5 microns wide and about 0.1 micron deep pits and/or protrusions (about 0.8 microns in diameter) situated on top of the tracks.

A parallel plate hydraulic press is used to emboss the tracking information contained on the stamper into a plastic sheet. The press platens are heated to about 180 degrees centigrade and the pressure adjusted to about 150 pounds per square inch. Total embossing time is expected to be about 30 seconds. After embossing, the metallized plastic sheet may be separated from the stamper and allowed to cool. The resulting media is expected to display an accurate mirror image representation of the stamper.

The substrate may then be coated with about a 200 Angstrom thick film of a metal alloy consisting of tin/bismuth/copper in a weight percent composition of 75/20/5, respectively. The coating is preferably done by rapid thermal evaporation of the alloy in a conventional Bell Jar vapor-deposition apparatus.

A diode laser read/write system may then be used to ablatively write micron sized digital information onto the formatted metallized plastic composite.

Playback ratios of greater than 30 to 1 are expected for spots created using pulse durations of about 1000 nanoseconds at about 10 milliwatts laser power. A write/read playback threshold value of about 1 milliwatt laser write power is expected for this system. Threshold values are expected to be a function of film thickness. The power level for the read laser is preferably kept well below about 1.0 milliwatts.

Microscopic analysis of the spots will reveal a well defined smooth pit sitting in the track.

The following examples, although not actually having been performed, describe the entire integrated process of fabricating and packaging of the completed optical disc.

EXAMPLE 10

Optical grade polycarbonate pellets are extruded into a sheet under clear room conditions. The resulting sheet is about 1.2 millimeters thick by about 16 centimeters wide. The birefringence across the sheet is preferably less than 100 nanometers.

This sheet is then metallized in a continuous metal deposition system. The metal layer consists of an alloy of tin/bismuth/copper in a weight percent composition of 75/20/5, respectively.

This metallized polycarbonate sheet is then embossed using a continuous feed stamping system. The stampers contains information in a form compatible with compact disc players. The temperature of the embossing chamber is about 110 degrees centigrade. Total embossing time is approximately 4 seconds.

The disc may then be cut out during embossing, or in a subsequent step, from the sheet, coated with a protective layer, and packaged.

This disc will be suitable for use as a read-only optical memory.

EXAMPLE 11

Optical grade polycarbonate or polyester pellets are extruded into a continuous tape. The resulting tape is about 0.2 millimeters thick by about 1.5 centimeters wide.

This tape is then metallized in a continuous metal deposition system. The metal layer consists of an alloy of tin/bismuth/copper in a weight percent composition of 75/20/5, respectively.

This metallized polycarbonate tape is then embossed using a continuous feed stamping system. The stamper contains formatting tracks and digital information in a form compatible with optical memory applications. The temperature of the embossing chamber is about 110 degrees centigrade.

The tape is then coated with a protective layer, and packaged.

This tape will be suitable for use as a Write-Once and ROM optical memory.

EXAMPLE 12

A 5.25 inch diameter polycarbonate disc is injection molded to form the polymeric substrate. The resulting disc is about 1.2 millimeters thick. The mold contains an insert having spiral tracks etched into its surface.

This substrate is coated with about a 200 Angstrom thick film of a metal alloy consisting of tin/bismuth/copper in a weight percent composition of 75/20/5, respectively. The coating is preferably done by rapid thermal evaporation of the alloy. Scanning electron micrographs will show a continuous film of the metal alloy throughout the surface of the disc. The metal surface is then coated with an acrylic lacquer. The resulting disc could function as Write-Once memory.

EXAMPLE 13

A polycarbonate substrate, similar to that described in Example 1 may be used as the substrate.

The uncoated polymeric sheet is subsequently embossed with the rigid metal stamper containing spiral formatting tracks etched into its surface. The stamper consists of about 0.1 micron deep tracks which are about 1.5 microns wide and about 0.3 micron deep less reflective spots (e.g. holes) (about 0.8 microns in diameter situated on top of the tracks).

A parallel plate hydraulic press is used to emboss the tracking information contained on the stamper into a plastic sheet. The press platens are heated to about 140 degrees centigrade and the pressure adjusted to about 120 pounds per square inch. Total embossing time is about 15 seconds. After embossing, the plastic sheet is separated from the stamper and allowed to cool and subsequently metallized. The resulting media is expected to display an accurate mirror image representation of the stamper.

EXAMPLE 14

A precleaned 100 micron thick film of polyester is coated with a thin layer (about 500 Angstroms) of a metal alloy consisting of tin/bismuth/copper in a weight percent composition of 70/25/5, respectively. The coating is done by conventional vapor deposition techniques.

This metallized polymer composite is embossed with a stamper and then adhesively laminated to a polycarbonate sheet to form a multi-layer structure, from which optical memory storage media in the form of discs or the like may be cut and/or punched.

EXAMPLE 15

Optical grade polycarbonate pellets are extruded into a sheet under clean room conditions. The resulting sheet is about 1.2 millimeters thick by about 16 centimeters wide. The birefringence across the sheet is preferably less than 100 nanometers.

Discs are cut out of the sheet and then subsequently metallized in a metal deposition system. The metal layer consists of an alloy of tin/bismuth/copper in a weight percent composition of 70/20/5, respectively.

This metallized polycarbonate disc is then embossed using a continuous feed stamping system. The stamper contains information in a form compatible with optical disc players. The temperature of the embossing chamber is about 110 degrees centigrade. Total embossing time is approximately 4 seconds.

The disc may then be coated with a protective layer and packaged as suitable for use as a read-only optical memory.

The following Examples, 16 through 23, have been performed.

EXAMPLE 16

A $1 \times 10^{-3}$ meter thick glass plate was used as the substrate. The substrate was coated with a 220 Angstrom thick film of a metal alloy consisting of tin/bismuth/copper in a weight percent composition of 75/20/5, respectively. The coating was done by rapid thermal evaporation of the alloy in a conventional Bell Jar vapor-deposition apparatus. A 0.02 gram wire sample of the alloy was resistively heated in a 1.5 centimeter tungsten boat using 120 amperes of current. The background pressure in the system was $8 \times 10^{-6}$ millimeters of Mercury. The thickness and rate of deposition of the film were monitored by an oscillating quartz crystal sensor.

The diode laser read/write system of Example 3 was used to ablatively write micron sized digital information into the metallized glass plate. Replay of the written data shows a high playback ratio.

EXAMPLE 17

A $3 \times 10^{-3}$ meter thick PMMA sheet was used as the substrate. It was cleaned using a methanol/water wash. The substrate was coated with a 150 Angstrom thick film of a metal alloy consisting of tin/bismuth/copper in a weight percent composition of 73/25/2, respectively. The coating was performed using the thermal evaporation method of Example 16.

A diode laser read/write system of Example 3 was used to ablatively write micron sized digital information into the metallized PMMA sheet. Playback of the digital information showed a high signal to noise ratio.

EXAMPLE 18

A polished aluminum plate was used as the substrate. The substrate was coated with a 140 Angstrom thick film of metal alloy consisting of tin/bismuth/copper in a weight percent composition of 75/20/5, respectively. The coating was performed using the thermal evaporation method of Example 16.

A diode laser read/write system of Example 3 was used to ablatively write micron sized digital information into the metallized aluminum plate. The signal from this sample showed a higher reflectance in the areas corresponding to laser written information. Reflectivity between irradiated and non-irradiated areas showed a high contrast.

EXAMPLE 19

A $5 \times 10^{-3}$ meter thick sample of a cast polycyanate polymer (thermoset) was used as the substrate. The substrate was coated with a 220 Angstrom thick film of a metal alloy consisting of tin/bismuth/copper in a weight percent composition of 75/20/5, respectively. The coating was performed using the thermal evaporation method of Example 16.

A diode laser read/write system of Example 3 was used to ablatively write micron sized digital information into the metallized thermoset plate. Contrast ratios were high.

EXAMPLE 20

A $0.5 \times 10^{-3}$ meter thick epoxy film plate was used as the substrate. The substrate was coated with a 205 Angstrom thick film of a metal alloy consisting of Tin/bismuth/copper in a weight percent composition of 75/20/5, respectively. The coating was performed using the thermal evaporation method of Example 16.

A diode laser read/write system of Example 3 was used to ablatively write micron sized digital information into the metallized epoxy film. Contrast ratios were high.

EXAMPLE 21

A series of $5 \times 10^{-3}$ meter thick polycarbonate sheets were used as substrate materials. Several substrates were coated with films ranging from approximately 50 Angstroms to 300 Angstroms of a metal alloy consisting of tin/bismuth/copper in a weight percent composition of 75/20/5, respectively. The coating was performed using the thermal evaporation method of Example 16. Reflectance measurements of the resulting samples showed reflectivities ranging from approximately 20% up to 90%.

A diode laser read/write system different from that described in Example 3 was used to ablatively write micron sized digital information into the metallized glass plate. The laser apparatus consisted of an intensity modulated Sharp LT015MT 20 milliwatt semiconductor laser. The output is collimated and tightly focused and imaged onto the metallized plastic composite. A light source is imaged onto the opposite side of the sample and reflected light is detected by a video camera. Spots which are created by the laser beam are detected as less reflective spots (e.g. holes) in the material by this camera.

The power and pulse duration of the laser beam were altered and threshold values for writing were determined for the various metal/polymer composites studied. The results are typical of those for commercial systems. The recording layer can be written on using about 0.5 nJ pulse for 50 nsec.

EXAMPLE 22

A $3 \times 10^{-3}$ meter thick PMMA sheet was used as the substrate. The substrate was coated with a 150 Angstrom thick film of a metal alloy consisting of tin/bismuth/copper in a weight percent composition of 75/20/5, respectively. The coating was performed using a Rf sputtering technique in an argon plasma. Film thickness was determined by reflectance measurements.

A diode laser read/write system of Example 3 was used to ablatively write micron sized digital information into the metallized polymer sheet. Contrast ratios were high.

EXAMPLE 23

A $3 \times 10^{-3}$ meter thick PMMA sheet was used as the substrate. The substrate was coated with 150 Angstrom thick film of a metal alloy consisting of tin/bismuth/copper in a weight percent composition of 71/25/4, respectively. The coating was performed using the thermal evaporation method of Example 16.

A diode laser read/write system of Example 3 was used to ablatively write micron sized digital information into the metallized PMMA sheet. Contrast ratios were high.

EXAMPLE 24

A $3 \times 10^{-3}$ meter thick polyaromatic estercarbonate copolymer was used as the substrate. The substrate was coated with a 200 Angstrom thick film of a metal alloy consisting of tin/bismuth/copper in a weight percent composition of 75/20/5, respectively. The coating was performed using the same thermal evaporation technique described in Example 16.

The diode laser read/write system of Example 3 was used to ablatively write micron sized digital information into the metallized polymer sheet. The playback of the data showed high signal to noise levels.

EXAMPLE 25

A $3 \times 10^{-3}$ meter thick glass fiber reinforced polypropylene was used at the substrate. The substrate was coated with a 180 Angstrom thick film of a metal alloy consisting of tin/bismuth/copper in a weight percent composition of 75/20/5, respectively. The coating was performed using the same thermal evaporation technique described in Example 16.

The diode laser read/write system of Example 3 was used to ablatively write micron sized digital information into the metallized polymer sheet. The playback of the data showed high signal to noise levels.

EXAMPLE 26

A $6 \times 10^{-3}$ meter thick cordierite ceramic was used as the substrate. The substrate was coated with a 220 Angstrom thick film of a metal alloy consisting of tin/bismuth/copper in a weight percent composition of 75/20/5, respectively. The coating was performed using the same thermal evaporation technique described in Example 16.

The diode laser read/write system of Example 3 was used to ablatively write micron sized digital information into the metallized polymer sheet. The playback of the data showed high signal to noise levels.

EXAMPLE 27

A $3 \times 10^{-3}$ meter thick PMMA was used as the substrate. The substrate was coated with a 20 Angstrom strike coat of copper. Then the substrate/copper composite was coated with a 200 Angstrom thick film of a metal alloy consisting of tin/bismuth/copper in a weight percent composition of 75/20/5, respectively. The coating was performed using the same thermal evaporation technique described in Example 16.

The diode laser read/write system of Example 3 was used to ablatively write micron sized digital information into the metallized polymer sheet. The playback of the data showed high signal to noise levels.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A medium for storage of information that can be optically read comprising a substrate layer and a highly reflective, soft metal alloy film adhered to at least one surface of the substrate layer, said soft metal alloy comprising, as percent by weight of the alloy, Sn (25-90), Bi (8-60) and Cu (1-25).

2. The medium of claim 1 including a protective layer which coats the surface of said metal alloy film opposite to the surface of the film which is adhered to said substrate surface said protective layer permitting the passage of a laser beam to impinge on the soft metal alloy film to thereby form a spot which can be optically read.

3. The medium of claim 1 wherein the soft metal alloy consists essentially of, as percent by weight, Sn (75), Bi (20) and Cu (5).

4. An optical memory storage media comprising:

A substrate, and a thin highly reflective soft metal alloy coating bonded to one surface of said substrate, said metal alloy comprising as percent by weight of each constituent of the alloy, Sn (at least 8), Bi (at least 8), and at least one of Mg, Au, Fe, Cr, Mn, Cu, Ag and Ni (at least 1) wherein Bi is present in an amount greater than any of Mg, Au, Fe, Cr, Mn, Cu, Ag, and Ni, said alloy coating having digital information contained thereon in the form of pits having a rim around the pit.

5. The optical memory storage media of claim 4 comprising, in addition, a protective coating on the surface of the metal alloy coating opposite to the surface of the metal alloy coating which is bonded to the surface of the substrate.

6. An optical storage medium comprising a plastic substrate having bonded to one surface thereof a thin soft metal alloy coating comprising a combination of, as percent by weight based on the total weight of the alloy, Sn (about 70 to 75) Bi (about 20 to about 25) and Cu (about 0 to about 5), said alloy coating having digital information contained thereon in the form of pits having a rim around the pit.

7. The optical storage medium of claim 6 including, in addition, a protective coating on the surface of the metal alloy coating opposite to the surface of the metal alloy coating which is bonded to the surface of the substrate.

* * * * *